United States Patent
Hara

(10) Patent No.: US 11,783,855 B2
(45) Date of Patent: Oct. 10, 2023

(54) MAGNETIC DISK DEVICE AND METHOD FOR SWITCHING BIAS VOLTAGE AND DRIVE VOLTAGE OF MICROACTUATOR

(71) Applicants: Kabushiki Kaisha Toshiba, Tokyo (JP); Toshiba Electronic Devices & Storage Corporation, Tokyo (JP)

(72) Inventor: Takeyori Hara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/583,897

(22) Filed: Jan. 25, 2022

(65) Prior Publication Data
US 2023/0073158 A1    Mar. 9, 2023

(30) Foreign Application Priority Data
Sep. 7, 2021 (JP) .................. 2021-145605

(51) Int. Cl.
G11B 5/48        (2006.01)
G11B 5/55        (2006.01)

(52) U.S. Cl.
CPC .......... *G11B 5/4873* (2013.01); *G11B 5/4833* (2013.01); *G11B 5/5573* (2013.01)

(58) Field of Classification Search
CPC .... G11B 5/4873; G11B 5/4833; G11B 5/5573
See application file for complete search history.

(56) References Cited

U.S. PATENT DOCUMENTS

| | | | | |
|---|---|---|---|---|
| 6,100,623 | A  * | 8/2000  | Huang ................ | G11B 5/4873 310/317 |
| 6,278,587 | B1 * | 8/2001  | Mei ...................... | G11B 5/5552 |
| 6,310,750 | B1 * | 10/2001 | Hawwa ............... | G11B 5/5556 360/294.6 |
| 6,747,837 | B1   | 6/2004  | Bennett | |
| 7,031,099 | B2 * | 4/2006  | Kohso ................. | G11B 5/4826 |
| 7,038,877 | B2 * | 5/2006  | Kohso ................. | G11B 5/556 360/78.04 |
| 7,126,252 | B2   | 10/2006 | Kita | |
| 7,548,396 | B2 * | 6/2009  | Higashino ........... | G11B 5/5547 360/78.04 |
| 8,125,741 | B2 * | 2/2012  | Shelor ................. | G11B 5/483 360/294.4 |
| 8,630,066 | B2 * | 1/2014  | Eguchi ................ | G11B 5/4873 360/294.6 |

(Continued)

FOREIGN PATENT DOCUMENTS

JP    4594069 B2    12/2010

*Primary Examiner* — Brian E Miller
(74) *Attorney, Agent, or Firm* — Allen & Overy LLP

(57) ABSTRACT

According to one embodiment, a magnetic disk device including a disk, a head that writes data to the disk and reads data from the disk, an actuator that is rotationally driven and controls movement of the head mounted above the disk, a microactuator that is mounted on the actuator and finely swings the head in a radial direction of the disk by a piezoelectric element that extends and contracts when a drive voltage based on a bias voltage is applied to the piezoelectric element, and a controller that switches the bias voltage according to an operation state during an access process.

20 Claims, 7 Drawing Sheets

(56) References Cited

U.S. PATENT DOCUMENTS

| | | | | |
|---|---|---|---|---|
| 8,810,971 B1* | 8/2014 | Vitikkate | ............... | G11B 5/483 360/294.4 |
| 9,117,468 B1* | 8/2015 | Zhang | .................... | G11B 5/483 |
| 9,330,694 B1* | 5/2016 | Hahn | .................... | G11B 5/483 |
| 9,331,940 B2* | 5/2016 | Balus | ...................... | H04L 49/70 |
| 2001/0012172 A1* | 8/2001 | Hawwa | .................. | G11B 21/24 |
| 2001/0036034 A1* | 11/2001 | Chang | ................. | G11B 5/5556 |
| 2001/0036035 A1* | 11/2001 | Morris | ................ | G11B 5/5552 |
| 2002/0036860 A1* | 3/2002 | Bi | ........................ | G11B 5/5552 |
| 2002/0048124 A1* | 4/2002 | Kuwajima | ............. | G11B 5/486 |
| 2002/0067565 A1* | 6/2002 | Kelemen | .............. | G11B 5/4873 |
| 2002/0114102 A1* | 8/2002 | Takekawa | ............ | G11B 5/5582 |
| 2003/0030937 A1* | 2/2003 | Kohso | ................... | G11B 21/18 |
| 2003/0223155 A1* | 12/2003 | Uchiyama | ............ | H10N 30/206 |
| 2004/0135472 A1* | 7/2004 | Kita | ...................... | H10N 30/802 |
| 2004/0136117 A1* | 7/2004 | Kuwajima | ........... | H10N 30/073 |
| 2005/0068657 A1* | 3/2005 | Yamamoto | ......... | G11B 5/59666 360/75 |
| 2009/0021857 A1* | 1/2009 | Shelor | ................... | G11B 5/483 360/77.16 |
| 2009/0027808 A1* | 1/2009 | Yao | ....................... | G11B 5/5552 360/294.4 |
| 2009/0080116 A1* | 3/2009 | Takahashi | ............ | G11B 5/4826 |
| 2009/0244786 A1* | 10/2009 | Hatch | ................... | G11B 5/483 360/294.4 |
| 2009/0310250 A1* | 12/2009 | Nagashima | .......... | G11B 5/5552 |
| 2010/0201291 A1* | 8/2010 | Cheiky | ................ | G11B 5/4873 318/116 |
| 2010/0301705 A1* | 12/2010 | Hata | .................... | G11B 5/4826 29/25.35 |
| 2012/0127614 A1* | 5/2012 | Arai | ..................... | G11B 5/4873 360/244.2 |
| 2013/0094106 A1* | 4/2013 | Chua | ................... | G11B 5/4873 29/603.01 |
| 2013/0194697 A1* | 8/2013 | Hironaka | ............ | G11B 5/5582 360/75 |
| 2015/0062748 A1* | 3/2015 | Cray | .................... | G11B 5/483 360/78.05 |
| 2015/0194591 A1* | 7/2015 | Fujii | .................... | H10N 30/802 318/116 |
| 2016/0217821 A1* | 7/2016 | Kumar | .................. | G11B 5/483 |
| 2017/0316797 A1* | 11/2017 | Ee | .......................... | H10N 30/50 |
| 2020/0294544 A1* | 9/2020 | Ishii | .................... | G11B 5/5552 |
| 2023/0073158 A1* | 3/2023 | Hara | .................... | G11B 5/4873 |

* cited by examiner

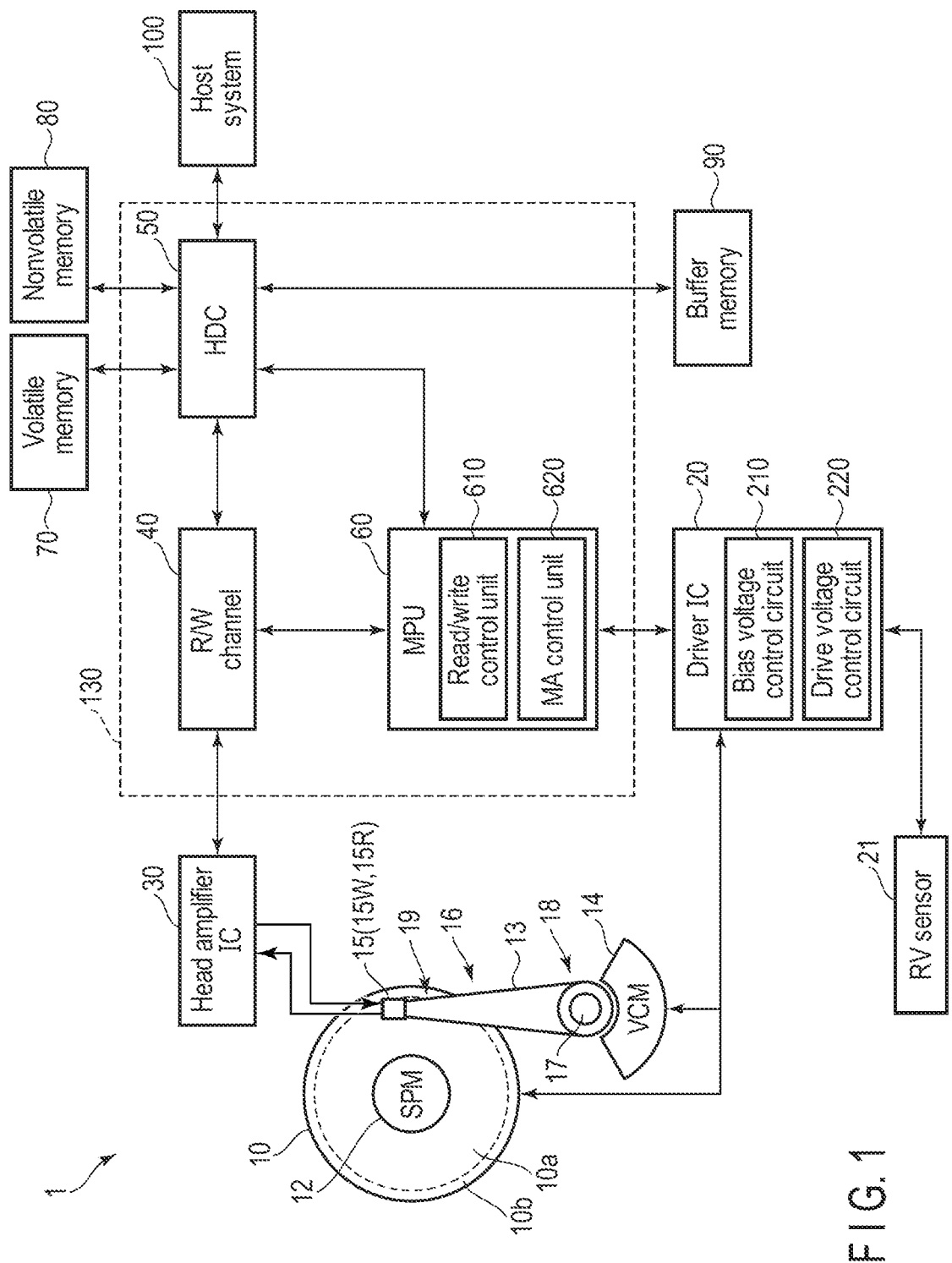
F I G. 1

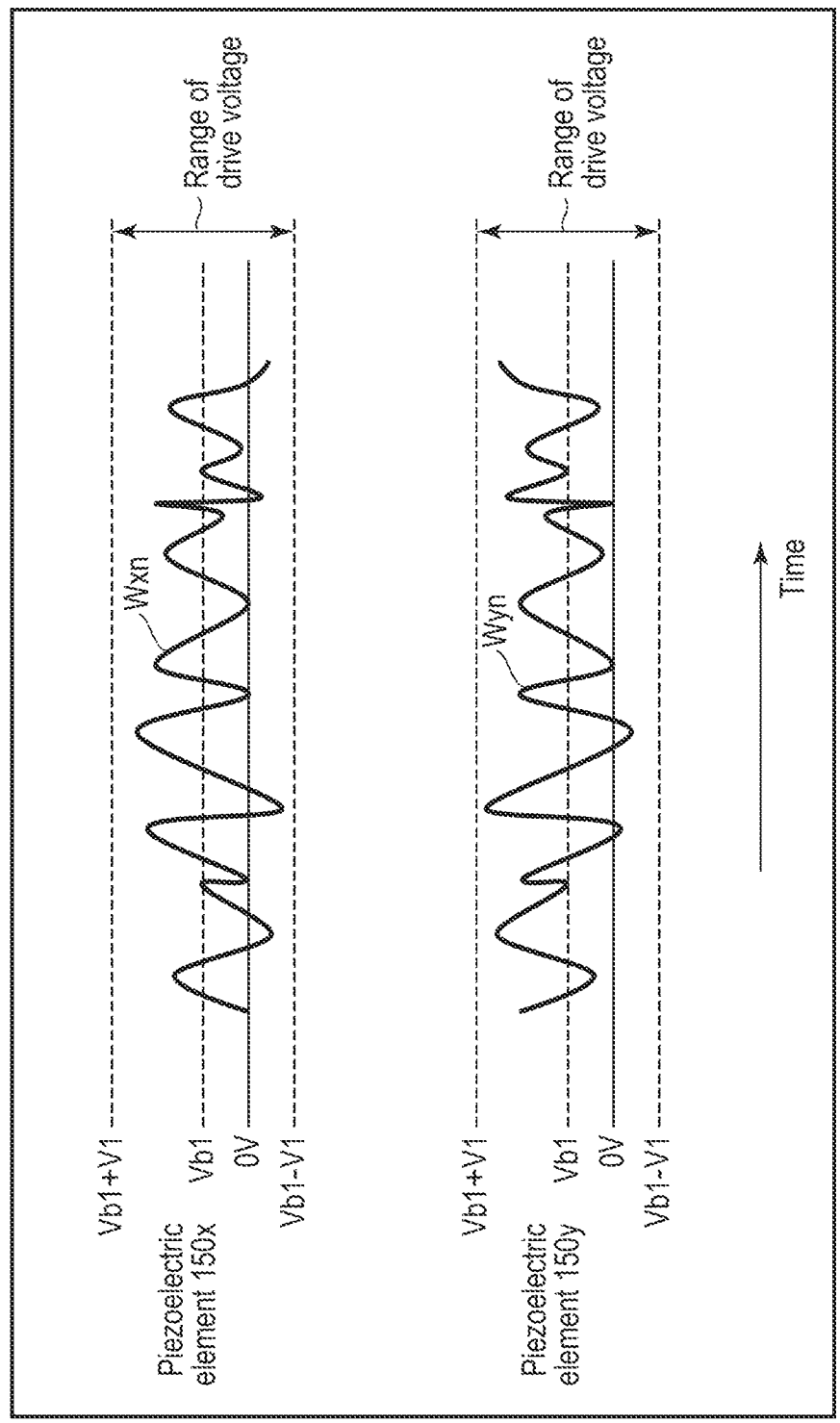
F I G. 5

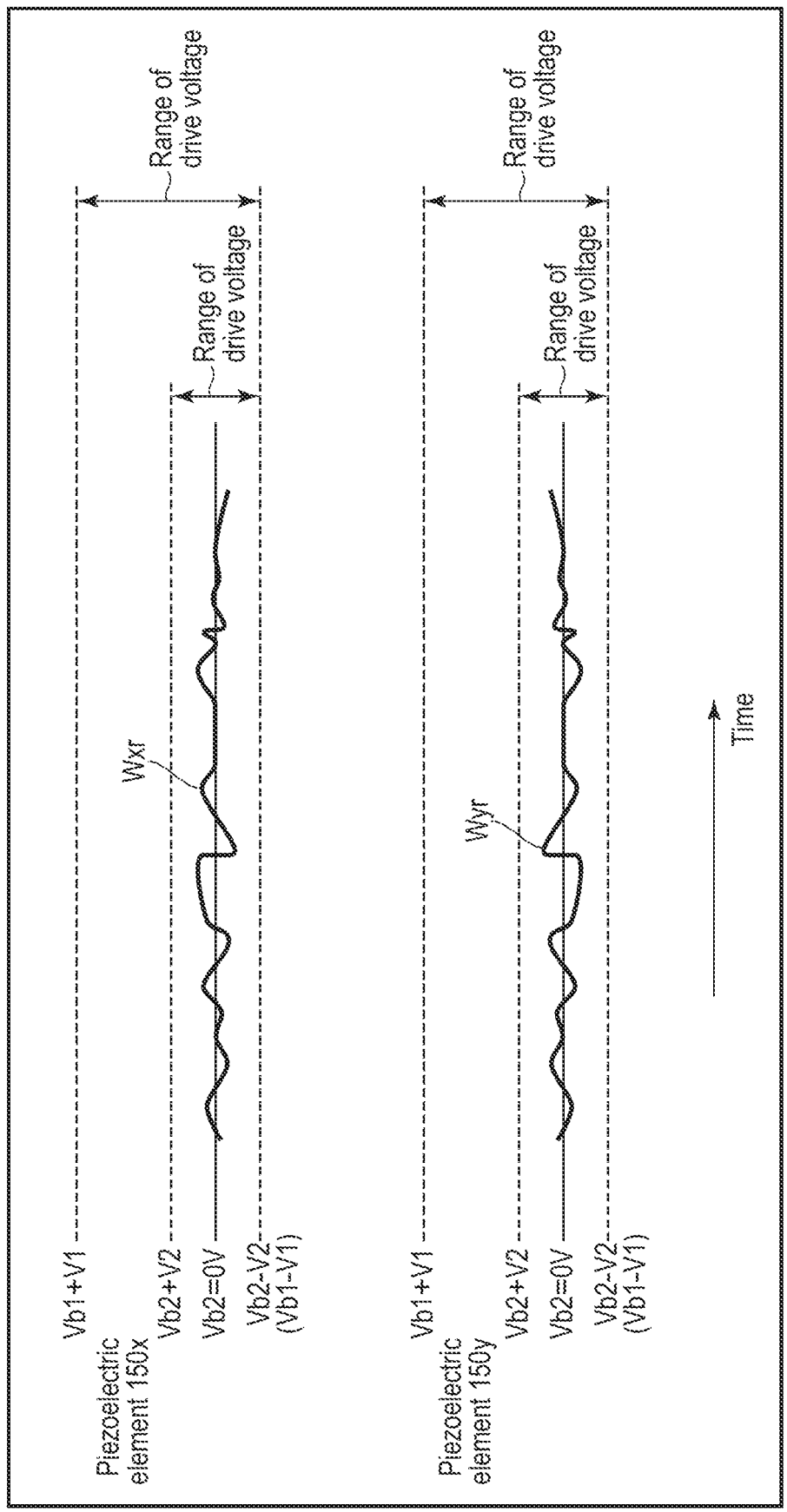
F I G. 6

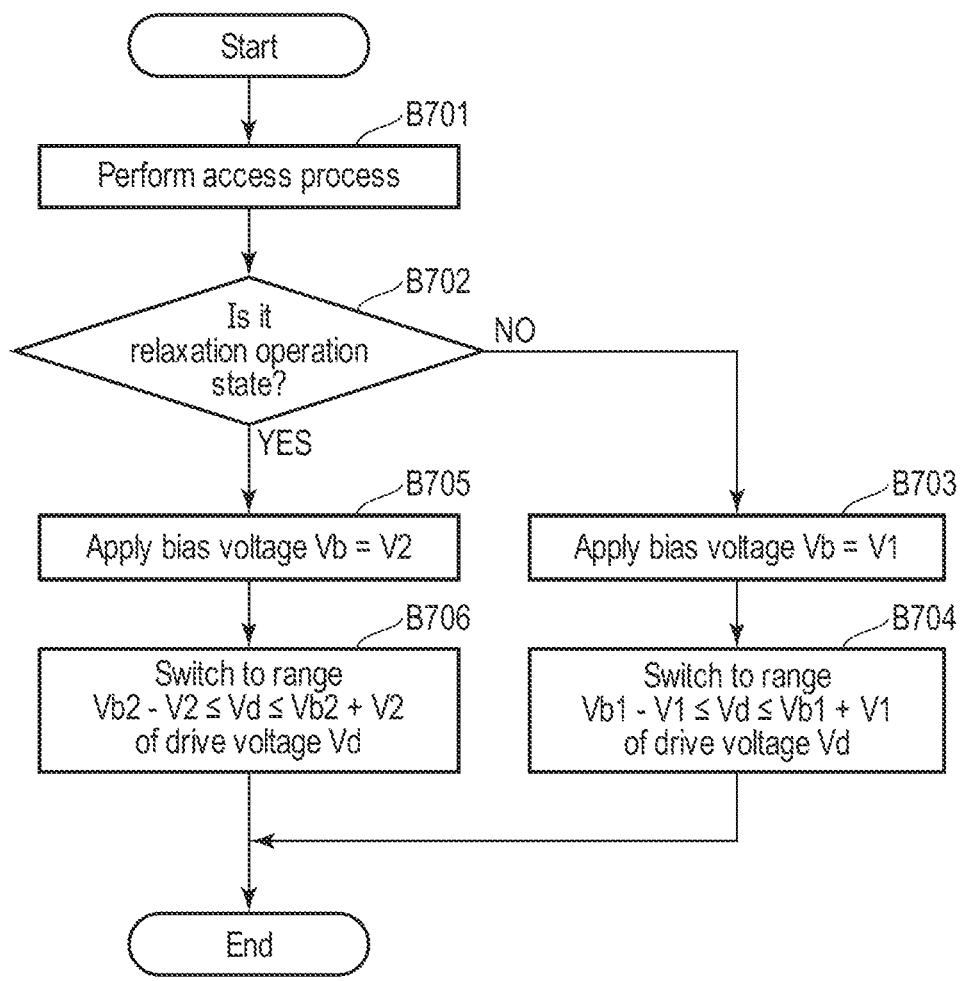
F I G. 7 though the head amplifier IC 30. The system controller 130 is electrically connected to the VCM 14 via a VCM driver (not illustrated).

MAGNETIC DISK DEVICE AND METHOD FOR SWITCHING BIAS VOLTAGE AND DRIVE VOLTAGE OF MICROACTUATOR

CROSS-REFERENCE TO RELATED APPLICATIONS

This application is based upon and claims the benefit of priority from Japanese Patent Application No. 2021-145605, filed Sep. 7, 2021, the entire contents of which are incorporated herein by reference.

FIELD

Embodiments described herein relate generally to a magnetic disk device and a method for switching a bias voltage and a drive voltage of a microactuator.

BACKGROUND

A magnetic disk device includes a plurality of disks rotatably disposed in a housing, at least one head that performs a read process and a write process on the disks, and a head actuator that support the head to be movable with respect to the disks.

The actuator includes at least one suspension assembly supporting the head at a distal end portion. The head suspension assembly includes a base plate having one end fixed to an arm, a load beam extending from the base plate, and a flexure (wiring member) provided on the load beam and the base plate. The flexure has a freely displaceable gimbal portion, and the head is supported by the gimbal portion.

In recent years, a head suspension assembly having a plurality of, for example, two piezoelectric elements constituting a microactuator has been proposed. The two piezoelectric elements are mounted on a flexure. Electrodes of the piezoelectric elements are electrically and mechanically connected to a conductor pattern of the flexure, for example, a conductive pad by, for example, a conductive adhesive.

Examples of a method for driving the microactuator include two types, single-ended driving and biased driving. In the single-ended driving, the two piezoelectric elements are polarized in opposite directions, and one drive voltage around 0 V is applied to the two piezoelectric elements to drive the piezoelectric elements in a push-pull method. On the other hand, in the biased driving, a drive voltage inverted with respect to the bias voltage is applied to the two piezoelectric elements to drive the two piezoelectric elements in a push-pull method. By performing the biased driving, it is possible to prevent the application of a reverse voltage that may depolarize these piezoelectric elements. In a case where a silver paste or the like is used as the conductive adhesive for the electrodes of the piezoelectric elements, when the bias voltage is continuously applied, the possibility that a short circuit occurs due to the migration of the silver paste between the positive electrodes and the negative electrodes may increase.

BRIEF DESCRIPTION OF THE DRAWINGS

FIG. 1 is a block diagram illustrating a configuration of a magnetic disk device according to an embodiment.

FIG. 5 is a schematic diagram illustrating an example of waveforms of drive voltages in a normal operation state according to the present embodiment.

FIG. 6 is a schematic diagram illustrating an example of waveforms of drive voltages in a relaxation operation state according to the present embodiment.

FIG. 7 is a flowchart illustrating an example of a method for switching a bias voltage and a drive voltage to be applied to each of piezoelectric elements of the microactuator according to the present embodiment.

DETAILED DESCRIPTION

Figure 2:
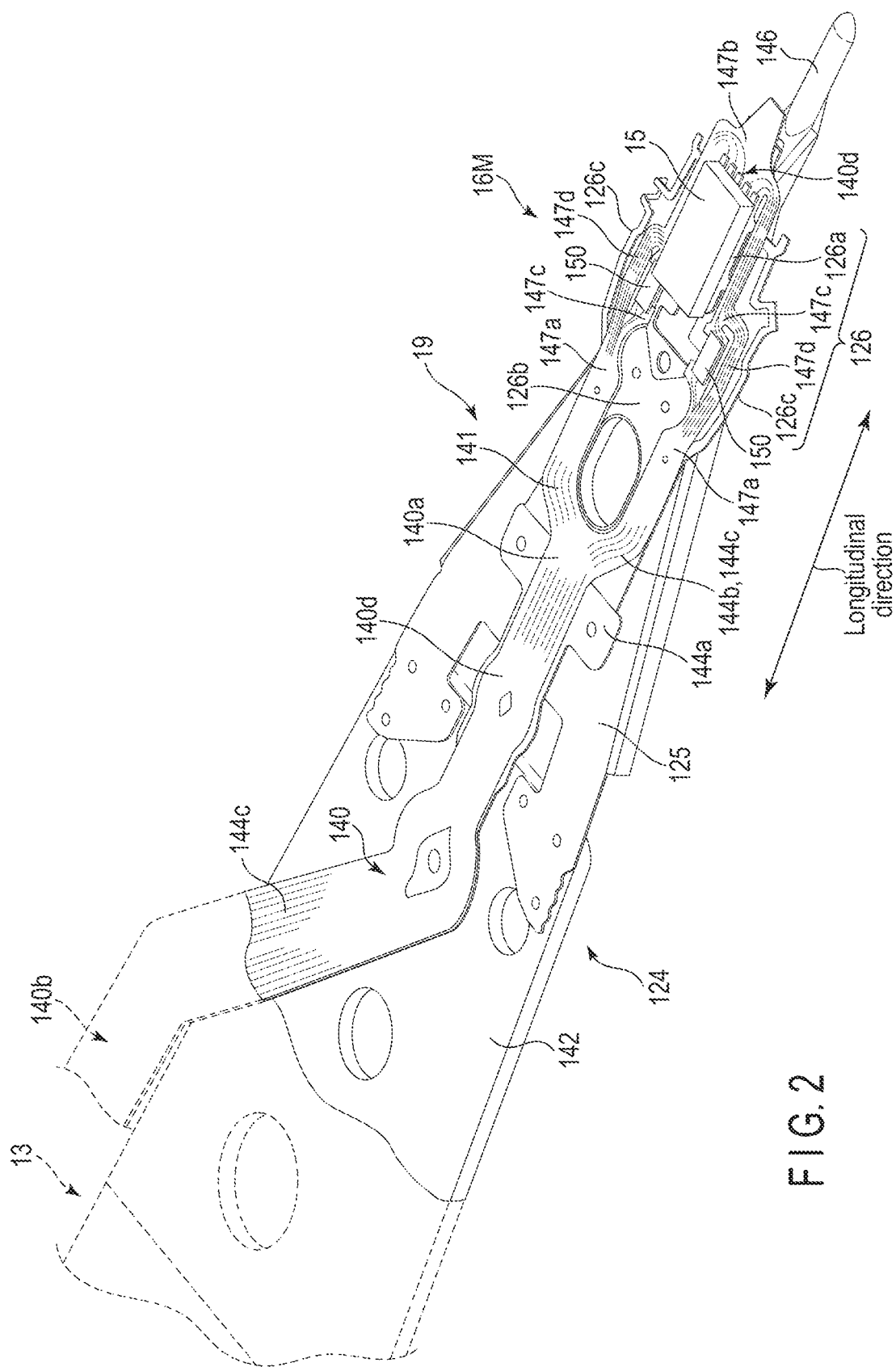
FIG. 2 is a perspective view illustrating a configuration example of a suspension assembly.

In general, according to one embodiment, a magnetic disk device comprising: a disk; a head that writes data to the disk and reads data from the disk; an actuator that is rotationally driven and controls movement of the head mounted above the disk; a microactuator that is mounted on the actuator and finely swings the head in a radial direction of the disk by a piezoelectric element that extends and contracts when a drive voltage based on a bias voltage is applied to the piezoelectric element; and a controller that switches the bias voltage according to an operation state during an access process.

Hereinafter, an embodiment will be described with reference to the drawings. Note that the drawings are merely examples, and do not limit the scope of the invention.

Embodiment

FIG. 1 is a block diagram illustrating a configuration of a magnetic disk device 1 according to the embodiment.

The magnetic disk device 1 includes a head disk assembly (HDA) described later, a driver IC 20, a head amplifier integrated circuit (hereinafter, referred to as a head amplifier IC or a preamplifier) 30, a volatile memory 70, a nonvolatile memory 80, a buffer memory (buffer) 90, and a system controller 130 which is a one-chip integrated circuit. In addition, the magnetic disk device 1 is connected to a host system (hereinafter, simply referred to as a host) 100.

The HDA includes a magnetic disk (hereinafter, referred to as a disk) 10, a spindle motor (hereinafter, referred to as an SPM) 12, an arm 13 on which a head 15 is mounted, and a voice coil motor (hereinafter, referred to as a VCM) 14. The disk 10 is attached to the SPM 12 and is rotated by driving of the SPM 12. A (head) actuator 16 includes the arm 13, an actuator block 18 incorporating a bearing unit 17, and a suspension assembly (sometimes referred to as a head gimbal assembly (HGA)) 19 extending from the arm 13. The head 15 is supported at a distal end portion of the suspension assembly 19. The actuator 16 is rotatably supported by a shaft erected on a bottom wall of a housing of the magnetic disk device 1 via the bearing unit 17. One or more disks 10, arms 13, heads 15, suspension assemblies 19, and the like may be provided.

A printed circuit board (not illustrated) is screwed to an outer surface of the bottom wall of the housing of the magnetic disk device 1. The system controller 130 is configured on the printed circuit board. The system controller 130 controls the operation of the SPM 12 and controls the operations of the VCM 14, the actuator 16, and the head 15 via a board unit (FPC unit) on which electronic components including a conversion connector and the like are mounted.

In the disk 10, a user data region 10a available from a user and a system area 10b in which information necessary for system management is written are allocated to an area in which the data can be written. Hereinafter, a direction from the inner circumference to the outer circumference of the disk 10 or a direction from the outer circumference to the inner circumference of the disk 10 is referred to as a radial direction. In the radial direction, the direction from the inner circumference to the outer circumference is referred to as an outward direction (or outer side), and the direction from the outer circumference to the inner circumference is referred to as an inward direction (or inner side). A circumferential direction corresponds to a direction along the circumference of the disk 10. The radial direction and the circumferential direction are orthogonal to each other. In addition, a particular position in the radial direction of the disk 10 may be referred to as a radial position, and a particular position in the circumferential direction of the disk 10 may be referred to as a circumferential position. The radial position and the circumferential position may be collectively referred to simply as a position. The user data region 10a of the disk 10 may be divided into a plurality of areas. For example, the user data region 10a can be divided for each region (hereinafter, it may be referred to as a zone) including a particular number of tracks in the radial direction. The zones may be sectioned for each track in the radial direction.

Note that a "track" is used as one recording area among a plurality of recording areas obtained by dividing the disk 10 in the radial direction, a recording area corresponding to one circumference at a particular radial position on the disk 10, a particular recording area at a particular radial position on the disk 10, a recording area extending in the circumferential direction of the disk 10, a recording area corresponding to a path of the head 15 positioned at a particular radial position on the disk 10, a path of the head 15 positioned at a particular radial position on the disk 10, data written in one recording area among a plurality of recording areas obtained by dividing the disk 10 in the radial direction, data written in a recording area corresponding to one circumference at a particular radial position on the disk 10, data written in a particular recording area at a particular radial position on the disk 10, data written in a recording area extending in the circumferential direction of the disk 10, data written in a recording area corresponding to a path of the head 15 positioned at a particular radial position on the disk 10, data written along a path of the head 15 positioned at a particular radial position on the disk 10, data extending in the circumferential direction on the disk 10, data written in the particular track of the disk 10, data for one circumference written in the particular track of the disk 10, and a part of data written in the particular track of the disk 10, and is used in other various senses. A "sector" is used as one recording area among a plurality of recording areas obtained by dividing a particular track of the disk 10 in the circumferential direction, one recording area among a plurality of recording areas obtained by dividing a recording area extending in the circumferential direction at a particular radial position on the disk 10, a particular recording area of a particular track of the disk 10, a particular circumferential position on a particular track of the disk 10, a particular circumferential position (particular position) at a particular radial position on the disk 10, data written in one recording area among a plurality of recording areas obtained by dividing a particular track of the disk 10 in the circumferential direction, data written in one recording area among a plurality of recording areas obtained by dividing a recording area extending in the circumferential direction at a particular radial position on the disk 10, data written in a particular recording area of a particular track of the disk 10, data written at a particular circumferential position on a particular track of the disk 10, data written at a particular circumferential position (particular position) at a particular radial position on the disk 10, and data written in the particular sector, and is used in various other senses. The "width of a track in the radial direction" may also be referred to as a "track width". A "path extending through the center position of a particular track in the width direction of the track" may also be referred to as a "track center". Data written in the user data region 10a and available by the user may be referred to as user data.

The head 15 includes a write head 15W and a read head 15R mounted on a slider as a main body. The write head 15W writes data to the disk 10. The read head 15R reads data recorded on the disk 10. Note that the "write head 15W" may be simply referred to as the "head 15", the "read head 15R" may be simply referred to as the "head 15", or the "write head 15W and the read head 15 R" may be collectively referred to simply as the "head 15". The "central portion of the head 15" may be referred to as the "head 15", the "central portion of the write head 15W" may be referred to as the "write head 15W", and the "central portion of the read head 15R" may be referred to as the "read head 15R". The "central portion of the write head 15W" may be simply referred to as the "head 15", and the "central portion of the read head 15R" may be simply referred to as the "head 15". "Positioning the central portion of the head 15 at the track center of a particular track" may be expressed as positioning the "head 15 on the particular track", "placing the head 15 on the particular track", "positioning the head 15 on the particular track", or the like.

FIG. 2 is a perspective view illustrating a configuration example of the suspension assembly 19.

As illustrated in FIG. 2, the suspension assembly 19 includes a suspension 124 extending from the arm 13 in the longitudinal direction, and the head 15 is attached to a distal end portion of the suspension 124. The head 15 and the suspension assembly 19 supporting the head 15 are collectively referred to as a head suspension assembly.

The suspension 124 functioning as a support plate includes a rectangular base plate 142 made of a metal plate having a thickness of several hundreds of microns, and an elongated leaf spring-like load beam 125 made of a metal plate having a thickness of several tens of microns. The load beam 125 has a proximal end portion disposed so as to overlap the distal end portion of the base plate 142 and is fixed to the base plate 142 by welding at a plurality of positions. The width of the proximal end portion of the load beam 125 is substantially equal to the width of the base plate 142. A rod-shaped tab 146 protrudes from the distal end of the load beam 125.

The suspension assembly 19 includes an elongated belt-shaped flexure (wiring member) 140 for transmitting a recording signal, a read signal, and a drive signal (drive voltage) to drive piezoelectric elements 150, and the pair of piezoelectric elements (for example, PZT elements) 150 mounted on the flexure 140. As illustrated in FIG. 2, the flexure 140 has a distal end side portion 140a disposed on the load beam 125 and the base plate 142, and a rear half portion (extension portion) 140b extending outward from a side edge of the base plate 142 and extending along a side edge of the arm 13. A connection end (not illustrated) located at the distal end of the extending portion 140b includes a plurality of connection pads (not illustrated). These connection pads are connected to a main FPC of the board unit.

The distal end portion of the flexure 140 is located on the distal end portion of the load beam 125 and constitutes a gimbal portion 126 functioning as an elastic support portion. The head 15 is mounted and fixed on the gimbal portion 126 and is supported by the load beam 125 via the gimbal portion 126. The pair of piezoelectric elements 150 as drive elements is mounted on the gimbal portion 126 and is located on the proximal end side of the load beam 125 with respect to the head 15. Hereinafter, a configuration including the piezoelectric elements 150 for causing the head 15 to swing in the radial direction of the disk 10 more finely than the swing in the radial direction (seek direction or cross-track direction of the head 15) of the disk 10 by the VCM 14 may be referred to as a microactuator 16M. The microactuator may also be referred to as MA.

As illustrated in FIG. 2, the flexure 140 includes a thin metal plate (metal plate) 144a made of stainless steel or the like as a base and a belt-shaped laminated member 141 attached or fixed onto the thin metal plate 144a, and forms an elongated laminated plate. The laminated member 141 includes a base insulating layer 144b mostly fixed to the thin metal plate 144a, and a conductive layer (wiring pattern) 144c formed on the base insulating layer 144b and constituting a plurality of signal wirings, a drive wiring, and a plurality of connection pads. As the conductive layer 144c, for example, copper foil can be used. At the distal end side portion 140a of the flexure 140, the thin metal plate 144a is attached onto the surfaces of the load beam 125 and the base plate 142 or is spot-welded at a plurality of welding points.

At the gimbal portion 126 of the flexure 140, the thin metal plate 144a has a rectangular tongue portion (support portion) 126a located on the distal end side, an approximately rectangular proximal end portion (proximal end plate portion) 126b located on the proximal end side with a space interposed between the tongue portion 126a and the proximal end portion 126b, and a pair of elongated outriggers (link portions) 126c extending from the tongue portion 126a to the proximal end portion 126b.

The proximal end portion 126b is attached onto the surface of the load beam 125 or is fixed onto the surface of the load beam 125 by spot welding. The tongue portion 126a is formed in a size and a shape that allow the head 15 to be placed, and is formed in, for example, an approximately rectangular shape. The tongue portion 126a is disposed such that a center axis extending in a width direction intersecting with, for example, orthogonal to the longitudinal direction matches a center axis (hereinafter, it may be simply referred to as a center axis of the suspension 124) extending in the width direction of the suspension 124. The tongue portion 126a can be displaced in various directions by the pair of outriggers 126c being elastically deformed. Accordingly, the tongue portion 126a and the head 15 flexibly follow the surface variation of the disk 10 in roll and pitch directions, and a minute gap can be maintained between the surface of the disk 10 and the head 15.

At the gimbal portion 126, a part of the laminated member 141 of the flexure 140 is bifurcated and located on both sides of the center axis of the suspension 124. The laminated member 141 includes a proximal end portion 147a fixed to the proximal end portion 126b of the thin metal plate 144a, a distal end portion 147b attached onto the tongue portion 126a, a pair of belt-shaped first bridge portions 147c extending from the proximal end portion 147a to the distal end portion 147b, and a pair of belt-shaped second bridge portions 147d extending from the proximal end portion 147a to middle portions of the first bridge portions 147c side by side with the first bridge portions 147c and joining the first bridge portions 147c. The first bridge portions 147c are positioned side by side with the outriggers 126c on both sides of the tongue portion 126a and extends along the longitudinal direction of the load beam 125.

The head 15 is fixed to the tongue portion 126a by an adhesive. The head 15 is disposed such that the center axis of the head 15 in the longitudinal direction matches the center axis of the suspension 124, and the recording element (write head 15W) and the read element (read head 15R) of the head 15 are electrically joined to a plurality of electrode pads 140d of the distal end portion 147b by a conductive adhesive such as solder or a silver paste. Thus, the head 15 is connected to the signal wirings via the electrode pads 140d.

Figure 3:
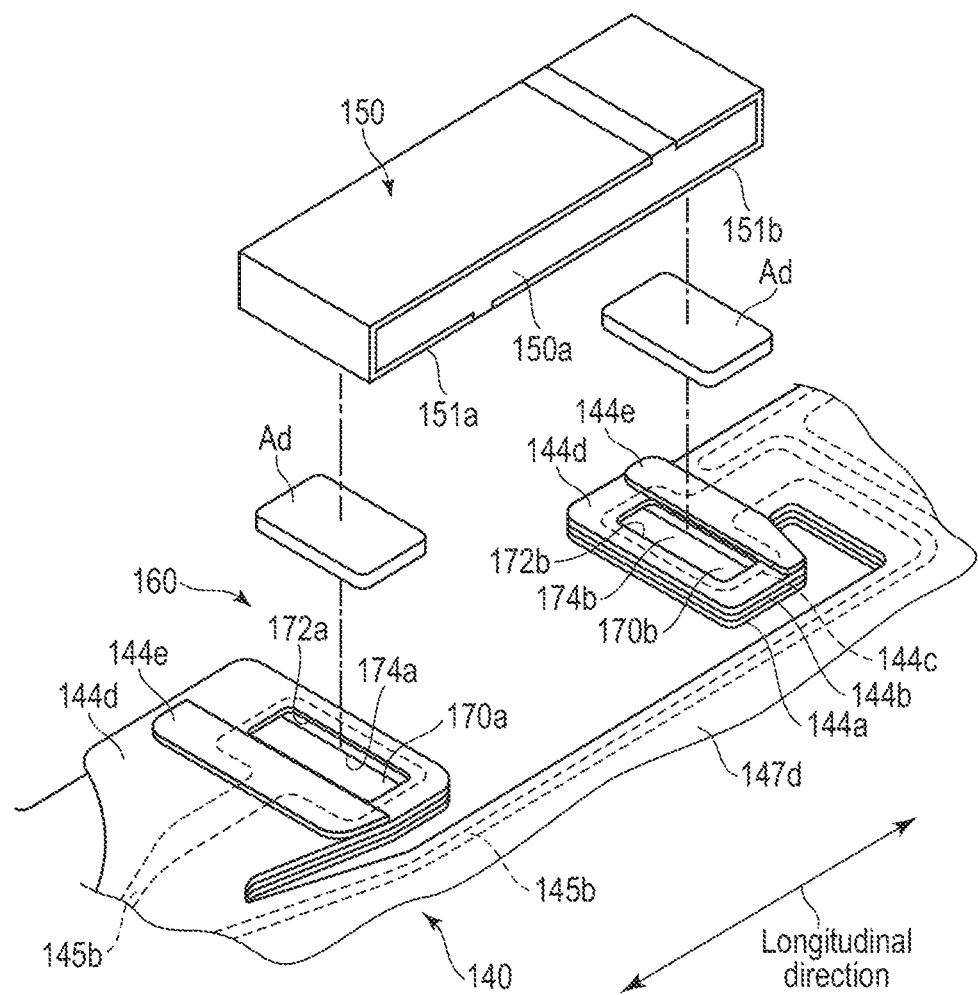
FIG. 3 is an exploded perspective view illustrating an example of a mounting portion of a flexure and a piezoelectric element.

FIG. 3 is an exploded perspective view illustrating an example of a mounting portion 160 of the flexure 140 and the piezoelectric element 150.

As illustrated in FIG. 3, the mounting portion 160 includes a first connection pad 170a and a second connection pad 170b each formed of a conductive layer 144c. Each of the first connection pad 170a and the second connection pad 170b is electrically connected to a drive wiring 145b including the conductive layer 144c. The first connection pad 170a and the second connection pad 170b are arranged at a particular interval in a direction parallel to the center axis of the load beam 125. In the present embodiment, the first bridge portions 147c of the flexure 140 are separated from each other between the first connection pad 170a and the second connection pad 170b. Accordingly, the first connection pad 170a and the second connection pad 170b are disposed with a space having a particular length interposed therebetween.

A rectangular recess 174a is formed in the base insulating layer 144b at a position overlapping the first connection pad 170a. The recess 174a is formed, for example, by half-etching a particular portion of the base insulating layer 144b. The recess 174a is formed in a rectangular shape slightly larger in dimension than the first connection pad 170a. The first connection pad 170a is formed to overlap the recess 174a, and is recessed along the recess 174a to form a recess.

A rectangular recess 174b is formed in the base insulating layer 144b at a position overlapping the second connection pad 170b. The recess 174b is formed, for example, by half-etching a particular portion of the base insulating layer 144b. The recess 174b is formed in a rectangular shape slightly larger in dimension than the second connection pad 170b. The second connection pad 170b is formed to overlap the recess 174a, and is recessed along the recess 174a to form a recess.

The number of recesses 174a of the base insulating layer 144b is not limited to one for the connection pad, the number of recesses 174b of the base insulating layer 144b is not limited to one for the connection pad, and a plurality of recesses may be provided for one connection pad. The shapes of the recesses 174a and 174b are not limited to a rectangular shape, and various shapes can be selected.

In a cover insulating layer 144d laminated on the conductive layer 144c, openings 172a and 172b are provided at positions overlapping the first connection pad 170a and the second connection pad 170b, respectively. Most of the first connection pad 170a and most of the second connection pad 170b are exposed to the outer surface of the cover insulating layer 144d through the openings 172a and 172b, respectively. In one example, the first connection pad 170a and the second connection pad 170b are each formed in a rectangular shape, and similarly, the openings 172a and 172b are formed in a rectangular shape slightly smaller in dimension than the connection pads.

A cover layer 144e is provided on the cover insulating layer 144d in the vicinity of the opening 172a. The cover layer 144e is provided on the drive wiring 145b side with respect to the opening 172a, that is, on the side opposite to the second connection pad 170b. In one example, the cover layer 144e is formed in an approximately rectangular shape and extends over substantially the entire width of the first bridge portions 147c. As will be described later, the cover layer 144e functions as a dam bank that regulates the spread of the conductive adhesive.

Similarly, the cover layer 144e is provided on the cover insulating layer 144d in the vicinity of the opening 172b. The cover layer 144e is provided on the drive wiring 145b side with respect to the opening 172b, that is, on the side opposite to the first connection pad 170a. In one example, the cover layer 144e is formed in an approximately rectangular shape and extends over substantially the entire width of the first bridge portions 147c. As will be described later, the cover layer 144e functions as a dam bank that regulates the spread of the conductive adhesive.

In one example, the cover layer 144e is formed to have substantially the same film thickness as the cover insulating layer 144d, and is formed of the same insulating material as the cover insulating layer 144d. Note that the shape of the cover layer 144e is not limited to a rectangular shape, and any shape can be selected. The cover layer 144e may be provided slightly away from the openings 172a and 172b.

In one example, each of the piezoelectric elements 150 as drive elements includes a piezoelectric main body 150a formed of a piezoelectric material in a flat rectangular parallelepiped shape, and a first electrode 151a and a second electrode 151b provided on an outer surface of the piezoelectric main body 150a. As the piezoelectric material, for example, zinc zirconate titanate, ceramic, or the like is used.

The first electrode 151a is provided extending from one end portion of the lower surface of the piezoelectric main body 150a to one side surface of the piezoelectric main body 150a on the short side and most of the upper surface of the piezoelectric main body 150a. The second electrode 151b is provided extending from one end portion of the upper surface of the piezoelectric main body 150a to the other side surface of the piezoelectric main body 150a on the short side and most of the lower surface of the piezoelectric main body 150a. On the lower surface of the piezoelectric main body 150a, one end of the first electrode 151a and one end of the second electrode 151b face each other with a gap. On the upper surface of the piezoelectric main body 150a, the other end of the first electrode 151a and the other end of the second electrode 151b face each other with a gap.

By applying a voltage between the first electrode 151a and the second electrode 151b, the piezoelectric main body 150a present between the first electrode 151a and the second electrode 151b extends or contracts in the longitudinal direction. In one example, the first electrode 151a is a voltage application (Vin) side electrode, and the second electrode 151b is a ground (GND) side electrode.

The piezoelectric element 150 is disposed on the mounting portion 160 in a state where one end portion (first electrode 151a) in the longitudinal direction of the piezoelectric main body 150a faces the first connection pad 170a and the other end portion (second electrode 151b) in the longitudinal direction faces the second connection pad 170b. A conductive adhesive Ad is filled between the first connection pad 170a and the first electrode 151a. As the conductive adhesive, for example, a silver paste, solder, or the like can be used. The first electrode 151a is electrically and mechanically connected to the first connection pad 170a by the conductive adhesive Ad. In this case, the conductive adhesive Ad fills the opening 172a of the cover insulating layer 144d and the recess of the first connection pad 170a along the recess 174a, and adheres to the surface of the first connection pad 170a and the inner surface (cover insulating layer 144d) of the opening 172a. Further, the conductive adhesive Ad adheres to the end edge of the cover layer 144e, and at the same time, is blocked by the cover layer 144e, and leakage to the drive wiring 145b side is regulated.

During operation of the microactuator 16M, a drive voltage is applied to the first electrode 151a via the drive wiring 145b, the first connection pad 170a, and the conductive adhesive Ad.

Similarly, the conductive adhesive Ad is filled between the second connection pad 170b and the second electrode 151b. The second electrode 151b is electrically and mechanically connected to the second connection pad 170b by the conductive adhesive Ad. In this case, the conductive adhesive Ad fills the opening 172b of the cover insulating layer 144d and the recess of the second connection pad 170b recessed along the recess 174b, and adheres to the surface of the second connection pad 170b and the inner surface (cover insulating layer 144d) of the opening 172b. Further, the conductive adhesive Ad adheres to the end edge of the cover layer 144e, and at the same time, is blocked by the cover layer 144e, and leakage to the drive wiring 145b side is regulated.

In the magnetic disk device 1 configured as described above, by applying a voltage (drive signal) to the piezoelectric elements 150 via the drive wiring 145b, each of the piezoelectric elements 150 extends and contracts along its longitudinal direction (direction parallel to the center axis of the suspension or direction in which the suspension assembly 19 extends). By driving the two piezoelectric elements 150 to cause the piezoelectric elements 150 to extend and contract in directions opposite to each other, the pair of first bridge portions 147c also strokes in directions opposite to each other. The first bridge portions 147c swing the tongue portion 126a of the gimbal portion 126 and the head 15. In this manner, the head 15 can be slightly displaced by the extension and contraction operation of the piezoelectric elements 150. The swing direction of the head 15 corresponds to the seek direction (cross-track direction or radial direction) of the head 15 above the disk 10.

The driver IC 20 is connected to the system controller 130 (specifically, an MPU 60 to be described later), the SPM 12, and the VCM 14, and controls driving of the SPM 12 and the VCM 14 according to control of the system controller 130 (specifically, the MPU 60 to be described later). The driver IC 20 includes a bias voltage control circuit 210 and a drive voltage control circuit 220. The bias voltage control circuit 210 controls a bias voltage to be applied to each of the piezoelectric elements 150 of the microactuator 16M. For example, the bias voltage control circuit 210 switches the bias voltage to a bias voltage selected from a plurality of preset bias voltages according to the control of the MPU 60. The drive voltage control circuit 220 controls a drive voltage to be applied to each of the piezoelectric elements 150 of the microactuator 16M. The drive voltage control circuit 220 controls the range of the drive voltage according to the control of the MPU 60 such that an excessive reverse bias voltage is not applied, for example.

The driver IC 20 is connected to a rotational vibration (RV) sensor 21, and transmits a detection value detected by the RV sensor 21 to the MPU 60. The RV sensor 21 can detect a vibration amount, a displacement amount, a speed, acceleration, and the like.

The head amplifier IC (preamplifier) 30 includes a read amplifier and a write driver. The read amplifier amplifies a read signal read from the disk 10 and outputs the amplified read signal to the system controller 130 (specifically, a read/write (R/W) channel 40 to be described later). The write driver outputs a write current corresponding to write data output from the R/W channel 40 to the head 15.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. The buffer memory 90 may be configured integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is implemented by using, for example, a large-scale integrated circuit (LSI) called a system-on-a-chip (SoC) in which a plurality of elements is integrated on a single chip. The system controller 130 includes the read/write (R/W) channel 40, a hard disk controller (HDC) 50, the microprocessor (MPU) 60, and the like. The R/W channel 40, the HDC 50, and the MPU 60 are electrically connected to each other. The system controller 130 is electrically connected to, for example, the driver IC 20, the head amplifier IC 30, the volatile memory 70, the nonvolatile memory 80, the buffer memory 90, the host 100, and the like.

The R/W channel 40 executes signal processing on data transferred from the disk 10 to the host 100, for example, read data and data transferred from the host 100, for example, write data, according to an instruction from the MPU 60 to be described later. The R/W channel 40 has a circuit or a function that measures the signal quality of read data. The R/W channel 40 is electrically connected to, for example, the head amplifier IC 30, the HDC 50, the MPU 60, and the like.

The HDC 50 controls the transfer of data. For example, the HDC 50 controls the transfer of data between the host 100 and the R/W channel 40 according to an instruction from the MPU 60 to be described later. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 via the driver IC 20 to execute servo control for positioning the head 15. The MPU 60 controls the SPM 12 via the driver IC 20 to rotate the disk 10. The MPU 60 controls an operation of writing data to the disk 10 and selects a storage destination of data transferred from the host 100, for example, a storage destination of write data. The MPU 60 controls an operation of reading data from the disk 10 and controls processing of data transferred from the disk 10 to the host 100, for example, read data. Further, the MPU 60 manages an area in which data is recorded. The MPU 60 is connected to each unit of the magnetic disk device 1. The MPU 60 is electrically connected to, for example, the driver IC 20, the R/W channel 40, the HDC 50, and the like.

The MPU 60 includes a read/write control unit 610 and an MA control unit 620. The MPU 60 executes processing of each unit, for example, the read/write control unit 610, the MA control unit 620, and the like on firmware. Note that the MPU 60 may include each unit, for example, the read/write control unit 610, the MA control unit 620, and the like as a circuit. The read/write control unit 610 may be included in the R/W 40 or the HDC 50.

The read/write control unit 610 controls a read process of reading data from the disk 10 and a write process of writing data to the disk 10 according to a command or the like from the host 100. The read/write control unit 610 controls the VCM 14 via the driver IC 20, positions the head 15 at a particular position on the disk 10, and performs the read process or the write process. In other words, the read/write control unit 610 positions the head 15 at a particular position on the disk 10 according to the MA control unit 620, and executes the read process or the write process. Hereinafter, the term "access" may be used in a sense including recording or writing data in a particular area (or the write process), reading data from a particular area (or the read process), and moving the head 15 or the like to a particular area.

The MA control unit 620 controls the microactuator 16M. The MA control unit 620 controls the microactuator 16M by biased driving. In a case where the microactuator 16M is controlled by the biased driving, the MA control unit 620 applies a drive voltage inverted with respect to the bias voltage Vb (or inverted using the bias voltage Vb as a reference) to each of the two piezoelectric elements 150 constituting a pair and included in the microactuator 16M to drive the two piezoelectric elements 150 in a push-pull method. The biased driving can prevent the application of a reverse voltage that may depolarize each of the polarized piezoelectric elements 150. Hereinafter, a voltage applied to the polarized piezoelectric element 150 to extend the polarized piezoelectric element 150 is defined as a positive voltage, and a voltage applied to the polarized piezoelectric element 150 to contract the polarized piezoelectric element 150 is defined as a negative voltage. Note that a voltage applied to the polarized piezoelectric element 150 to extend the polarized piezoelectric element 150 may be a negative voltage, and a voltage applied to the polarized piezoelectric element 150 to contract the polarized piezoelectric element 150 may be a positive voltage.

The MA control unit 620 controls a bias voltage to be applied to each of the piezoelectric elements 150 of the microactuator 16M via the bias voltage control circuit 210. The MA control unit 620 switches the bias voltage Vb to be applied to each of the piezoelectric elements 150 according to an operation state (hereinafter, it may be simply referred to as an operation state) during an access process.

When the MA control unit 620 determines that the operation state is an operation state (hereinafter, it may be referred to as a normal operation state) in which the access process is normally performed, the MA control unit applies the bias voltage $Vb=Vb1$ to the piezoelectric element 150. In other words, the MA control unit 620 sets the bias voltage $Vb=Vb1$ upon determining that the operation state is the normal operation state. That is, the MA control unit 620 switches the bias voltage Vb to Vb1.

In a case where the MA control unit 620 determines that the operation state is an operation state (hereinafter, it may be referred to as a relaxation operation state) in which a requirement (for example, accuracy, size, and the like) for control performance such as the positioning of the head 15 or a bit error rate is relaxed during the access process, compared to a requirement for control performance during the access process normally performed, the MA control unit applies, to the piezoelectric element 150, the absolute value (|Vb2|<|Vb1|) of the bias voltage Vb=Vb2 smaller than the absolute value of the bias voltage Vb=Vb1 applied to the piezoelectric element 150 when the MA control unit 620 determines that the operation state is the normal operation state. In other words, upon determining that the operation state is the relaxation operation state, the MA control unit 620 sets the absolute value (|Vb2|<|Vb1|) of the bias voltage Vb=Vb2 smaller than the absolute value of the bias voltage Vb=Vb1 set when the MA control unit 620 determines that the operation state is the normal operation state. That is, upon determining that the operation state is the relaxation operation state, the MA control unit 620 switches from the absolute value of the bias voltage Vb=Vb1 set when the MA control unit 620 determines that the operation state is the normal operation state to the absolute value (|Vb2|<|Vb1|) of the bias voltage Vb=Vb2 smaller than the absolute value of the bias voltage Vb=Vb1.

When the absolute value of the bias voltage Vb=Vb1 applied to the piezoelectric element 150 in the normal operation state is larger than 0, and the MA control unit 620 determines that the operation state is the relaxation operation state such as a background media scan state, the MA control unit 620 applies the bias voltage Vb=Vb2=0 to the piezoelectric element 150. In other words, when the absolute value of the bias voltage Vb=Vb1 set in the normal operation state is larger than 0, and the MA control unit 620 determines that the operation state is the relaxation operation state such as the background media scan state, the MA control unit 620 sets the bias voltage Vb=Vb2=0. That is, when the absolute value of the bias voltage Vb=Vb1 set in the normal operation state is larger than 0, and the MA control unit 620 determines that the operation state is the relaxation operation state such as the background media scan state, the MA control unit 620 switches from the bias voltage Vb=Vb1 to the bias voltage Vb=Vb2=0 smaller than the absolute value of the bias voltage Vb=Vb1.

When the absolute value of the bias voltage Vb=Vb1 applied to the piezoelectric element 150 is larger than 0 in the normal operation state, and the MA control unit 620 determines that external vibration is small, for example, an operation state in which the detection value of the RV sensor 21 is determined to be smaller than a threshold (hereinafter, the threshold may be referred to as a vibration detection threshold) indicating that the external vibration is larger than allowable magnitude, or an operation state in which the positioning error is smaller than a threshold (hereinafter, it may be referred to as a vibration accuracy threshold) indicating that the external vibration is larger than the allowable magnitude, the MA control unit 620 applies the bias voltage Vb=Vb2=0 to the piezoelectric element 150. In other words, the MA control unit 620 sets the bias voltage Vb=Vb2=0 upon determining that the operation state is the relaxation operation state such as the external vibration is small. That is, when the absolute value of the bias voltage Vb=Vb1 set in the normal operation state is larger than 0, and the MA control unit 620 determines that the operation state is the relaxation operation state such as the operation state in which the external vibration is small, the MA control unit 620 switches from the bias voltage Vb=Vb1 to the bias voltage Vb=Vb2=0 smaller than the absolute value of the bias voltage Vb=Vb1.

In addition, the MA control unit 620 controls a range of a drive voltage to be applied to each of the piezoelectric elements 150 of the microactuator 16M via the drive voltage control circuit 220. The MA control unit 620 switches the range of the drive voltage to be applied to each of the piezoelectric elements 150 according to the operation state.

Upon determining that the operation state is the normal operation state, the MA control unit 620 applies the bias voltage Vb=Vb1 to the piezoelectric element 150, and sets a range Vb1−V1≤Vd≤Vb1+V1 of the drive voltage Vd to be applied to the piezoelectric element 150. In other words, upon determining that the operation state is the normal operation state, the MA control unit 620 sets the bias voltage Vb=Vb1, and sets the range Vb1−V1≤Vd≤Vb1+V1 of the drive voltage Vd to be applied to the piezoelectric element 150. That is, upon determining that the operation state is the normal operation state, the MA control unit 620 switches the bias voltage Vb to Vb1, and switches the range of the drive voltage Vd to the range Vb1−V1≤Vd≤Vb1+V1. In this case, Vb1−V1 is set to be a value equal to or higher than a lower limit of the reverse bias voltage. For example, Vb1−V1 corresponds to the lower limit of the reverse bias voltage that allows the piezoelectric element 150 to be normally operated. The maximum range of the drive voltage may be switched by a circuit using a combination of the maximum range of a DAC and the gain of an amplifier, or a range to be output to the DAC may be limited by software.

Upon determining that the operation state is the relaxation operation state, the MA control unit 620 applies the bias voltage Vb=Vb2 (|Vb2|<|Vb1|) to the piezoelectric element 150, and sets a range Vb2−V2≤Vd≤Vb2+V2 of the drive voltage Vd to be applied to the piezoelectric element 150. The range Vb2−V2≤Vd≤Vb2+V2 is narrower (or less) than the range Vb1−V1≤Vd≤Vb1+V1 of the drive voltage Vd to be applied to the piezoelectric element 150 when the MA control unit 620 determines that the operation state is the normal operation state. In other words, upon determining that the operation state is the relaxation operation state, the MA control unit 620 sets the bias voltage Vb=Vb2 (|Vb2|<|Vb1|), and sets the range Vb2−V2≤Vd≤Vb2+V2 of the drive voltage Vd to be applied to the piezoelectric element 150. The range Vb2−V2≤Vd≤Vb2+V2 is narrower (or less) than the range Vb1−V1≤Vd≤Vb1+V1 of the drive voltage Vd to be applied to the piezoelectric element 150 when the MA control unit 620 determines that the operation state is the normal operation state. That is, upon determining that the operation state is the relaxation operation state, the MA control unit 620 switches from the bias voltage Vb=Vb1 to the bias voltage Vb=Vb2 (|Vb2|<|Vb1|), and switches from the range Vb1−V1≤Vd≤Vb1+V1 of the drive voltage Vd to the range Vb2−V2≤Vd≤Vb2+V2 of the drive voltage Vd. In this case, |Vb2−V2|≤|Vb1−V1|.

When the absolute value of the bias voltage Vb=Vb1 to be applied to the piezoelectric element 150 in the normal operation state is larger than 0, and the MA control unit 620 determines that the operation state is the relaxation operation state such as the background media scan state, the MA control unit 620 applies the bias voltage Vb=Vb2=0 to the piezoelectric element 150, for example, and sets the range of the drive voltage Vd to be applied to the piezoelectric element 150 to 0−V2≤Vd≤0+V2. In other words, when the absolute value of the bias voltage Vb=Vb1 applied to the piezoelectric element 150 in the normal operation state is larger than 0, and the MA control unit 620 determines that the operation state is the relaxation operation state such as the background media scan state, the MA control unit 620 sets, for example, the bias voltage Vb=Vb2=0 and sets the range of the drive voltage Vd to be applied to the piezoelectric element 150 to 0−V2≤Vd≤0+V2. That is, when the absolute value of the bias voltage Vb=Vb1 applied to the piezoelectric element 150 in the normal operation state is larger than 0, and the MA control unit 620 determines that the operation state is the relaxation operation state such as the background media scan state, the MA control unit 620 switches from the bias voltage Vb=Vb1 to the bias voltage Vb=Vb2=0, for example, and switches from the range Vb1−V1≤Vd≤Vb1+V1 of the drive voltage Vd to the range Vb2−V2≤Vd≤Vb2+V2 of the drive voltage Vd.

When the absolute value of the bias voltage Vb=Vb1 applied to the piezoelectric element 150 is larger than 0 in the normal operation state, and the MA control unit 620 determines that the external vibration is small, for example, when the MA control unit 620 determines that the operation state is the relaxation operation state such as an operation state in which the detection value of the RV sensor 21 is determined to be smaller than the vibration detection threshold or an operation state in which the positioning error is smaller than the vibration accuracy threshold, the MA control unit 620 applies the bias voltage Vb=Vb2=0 to the piezoelectric element 150 and sets the range of the drive voltage Vd to be applied to the piezoelectric element 150 to 0−V2≤Vd≤0+V2. In other words, when the absolute value of the bias voltage Vb=Vb1 applied to the piezoelectric element 150 is larger than 0 in the normal operation state, and the MA control unit 620 determines that the operation state is the relaxation operation state such as an operation state in which the external vibration is small, the MA control unit 620 sets, for example, the bias voltage Vb=Vb2=0 and sets the range of the drive voltage Vd to be applied to the piezoelectric element 150 to 0−V2≤Vd≤0+V2. That is, when the absolute value of the bias voltage Vb=Vb1 applied to the piezoelectric element 150 is larger than 0 in the normal operation state, and the MA control unit 620 determines that the operation state is the relaxation operation state such as an operation state in which the external vibration is small, for example, the MA control unit 620 switches from the bias voltage Vb=Vb1 to the bias voltage Vb=Vb2=0, and switches from the range Vb1−V1≤Vd≤Vb1+V1 of the drive voltage Vd to the range Vb2−V2≤Vd≤Vb2+V2 of the drive voltage Vd.

Figure 4:
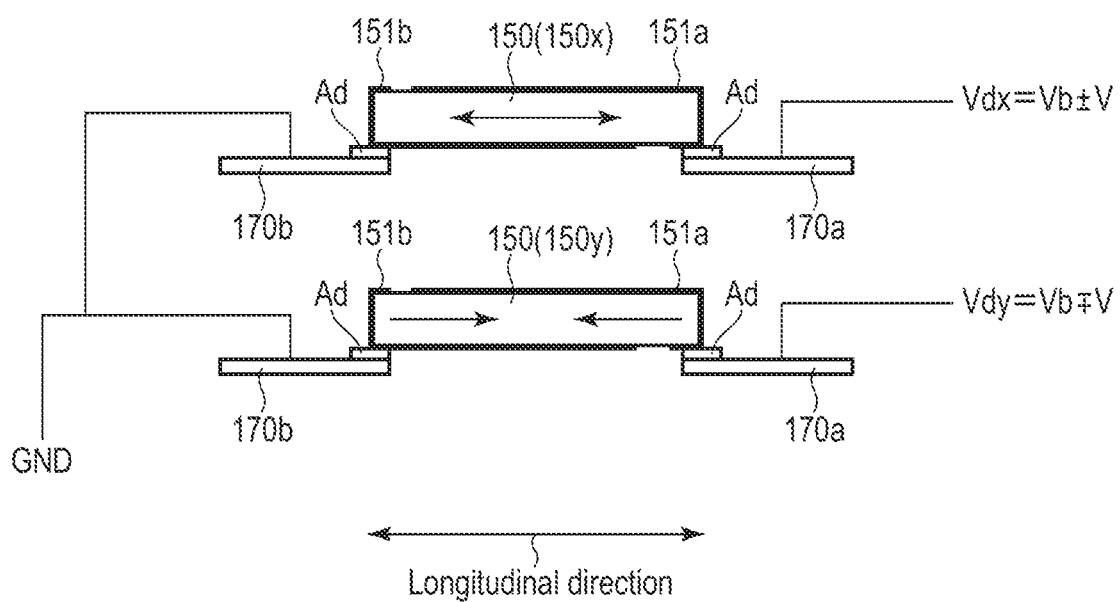
FIG. 4 is a schematic diagram illustrating an example of the connection of a wiring to a microactuator and ranges of a bias voltage and a drive voltage.

FIG. 4 is a schematic diagram illustrating an example of the connection of a wiring to the microactuator and ranges of the bias voltage and the drive voltage. FIG. 4 corresponds to FIG. 3. FIG. 4 illustrates the piezoelectric element 150 (150x) and the piezoelectric element 150 (150y). FIG. 4 illustrates a drive voltage Vdx applied to the piezoelectric element 150x and a drive voltage Vdy applied to the piezoelectric element 150y.

Upon determining that the operation state is the normal operation state, the MA control unit 620 switches from the bias voltage Vbx=Vb2 to the bias voltage Vbx=Vb1, applies the bias voltage Vbx=Vb1 to the piezoelectric element 150x, and switches from the range Vb2 (=0)−V2≤Vdx≤Vb2 (=0)+V2 of the drive voltage Vdx to the range Vb1−V1≤Vdx≤Vb1+V1 of the drive voltage Vdx.

Upon determining that the operation state is the normal operation state, the MA control unit 620 switches from the bias voltage Vby=Vb2 to the bias voltage Vby=Vb1, applies the bias voltage Vby=Vb1 to the piezoelectric element 150y, and switches from the range Vb2 (=0)−V2≤Vdy≤Vb2 (=0)+V2 of the drive voltage Vdy to the range Vb1−V1≤Vdy≤Vb1+V1 of the drive voltage Vdy.

Upon determining that the operation state is the normal operation state, for example, the MA control unit 620 applies the drive voltage Vdx to the piezoelectric element 150x to extend the piezoelectric element 150x in the longitudinal direction, and applies the drive voltage Vdy obtained by inverting the drive voltage Vdx with respect to the bias voltage Vb1 to the piezoelectric element 150y to contract the piezoelectric element 150y in the longitudinal direction.

Upon determining that the operation state is the relaxation operation state, the MA control unit 620 switches from the bias voltage Vbx=Vb1 to the bias voltage Vbx=Vb2, applies the bias voltage Vbx=Vb2 (|Vb2|<|Vb1| and |Vb1|>0)=0 to the piezoelectric element 150x, and switches from the range Vb1−V1≤Vdx≤Vb1+V1 of the drive voltage Vdx to the range Vb2 (=0)−V2≤Vdx≤Vb (=0)+V2 of the drive voltage Vdx.

Upon determining that the operation state is the relaxation operation state, the MA control unit 620 switches from the bias voltage Vby=Vb1 to the bias voltage Vby=Vb2, applies the bias voltage Vby=Vb2 (|Vb2|<|Vb1| and |Vb1|>0)=0 to the piezoelectric element 150y, and switches from the range Vb1−V1≤Vdy≤Vb1+V1 of the drive voltage Vdy to the range Vb2 (=0)−V2≤Vdy≤Vb2 (=0)+V2 of the drive voltage Vdy.

Upon determining that the operation state is the relaxation operation state, for example, the MA control unit 620 applies the drive voltage Vdx to the piezoelectric element 150x to extend the piezoelectric element 150x in the longitudinal direction, and applies the drive voltage Vdy obtained by inverting the drive voltage Vdx with reference to the bias voltage Vb2 to the piezoelectric element 150y to contract the piezoelectric element 150y in the longitudinal direction.

FIG. 5 is a schematic diagram illustrating an example of waveforms of the drive voltages Vd in the normal operation state according to the present embodiment. FIG. 5 corresponds to FIG. 4. In FIG. 5, the horizontal axis represents time, and the vertical axis represents the magnitude of the voltage. The upper diagram of FIG. 5 illustrates a waveform Wxn of the drive voltage Vdx applied to the piezoelectric element 150x when the bias voltage Vb1 is applied to the piezoelectric element 150x in the normal operation state. The lower diagram of FIG. 5 illustrates a waveform Wyn of the drive voltage Vdy applied to the piezoelectric element 150y when the bias voltage Vb1 is applied to the piezoelectric element 150y in the normal operation state.

The waveform Wxn and the waveform Wyn are inverted from each other with respect to the bias voltage Vb1. Further, the waveform Wxn and the waveform Wyn fluctuate within the range Vb1−V1≤Vdx≤Vb1+V1 of the drive voltage Vdx and within the range Vb1−V1≤Vdy≤Vb1+V1 of the drive voltage Vdy, respectively.

FIG. 6 is a schematic diagram illustrating an example of waveforms of the drive voltages Vd in the relaxation operation state according to the present embodiment. FIG. 6 corresponds to FIG. 5. In FIG. 6, the horizontal axis represents time, and the vertical axis represents the magnitude of the voltage. The upper diagram of FIG. 6 illustrates a waveform Wxr of the drive voltage Vdx applied to the piezoelectric element 150x when the bias voltage Vb2 (=0) is applied to the piezoelectric element 150x in the relaxation operation state. In the upper diagram of FIG. 6, a range Vb2−V2≤Vdx≤Vb2+V2 of the drive voltage Vdx applied to the piezoelectric element 150x when the bias voltage Vb2 (=0) is applied to the piezoelectric element 150x in the relaxation operation state is indicated by dotted lines. In the upper diagram of FIG. 6, for comparison, a range Vb1−V1≤Vdx≤Vb1+V1 of the drive voltage Vdx applied to the piezoelectric element 150x when the bias voltage Vb1 is applied to the piezoelectric element 150x in the normal operation state is indicated by dotted lines. The lower diagram of FIG. 6 illustrates a waveform Wyr of the drive voltage Vdy applied to the piezoelectric element 150y when the bias voltage Vb2 (=0) is applied to the piezoelectric element 150y in the relaxation operation state. In the lower diagram of FIG. 6, a range Vb2−V2≤Vdy≤Vb2+V2 of the drive voltage Vdy applied to the piezoelectric element 150y when the bias voltage Vb2 (=0) is applied to the piezoelectric element 150y in the relaxation operation state is indicated by dotted lines. In the lower diagram of FIG. 6, for comparison, a range Vb1−V1≤Vdy≤Vb1+V1 of the drive voltage Vdy applied to the piezoelectric element 150y when the bias voltage Vb1 is applied to the piezoelectric element 150y in the normal operation state is indicated by dotted lines. In FIG. 6, |Vb1−V1|=|Vb2−V2|.

The waveform Wxr and the waveform Wyr are inverted from each other with respect to the bias voltage Vb2. The waveform Wxr and the waveform Wyr fluctuate within a range Vb2−V2≤Vdx≤Vb2+V2 of the drive voltage Vdx and within a range Vb2−V2≤Vdy≤Vb2+V2 of the drive voltage Vdy, respectively. The drive voltage Vdx of the waveform Wxr is in a narrower range Vb2−V2≤Vdx≤Vb2+V2 than the range Vb1−V1≤Vdx≤Vb1+V1 of the drive voltage Vdx of the waveform Wxn illustrated in FIG. 5. The waveform Wxr fluctuates based on the bias voltage Vb=Vb2=0. The fluctuation of the waveform Wxr is smaller than the fluctuation of the waveform Wxn illustrated in FIG. 5. The drive voltage Vdy of the waveform Wyr is in a narrower range Vb2−V2≤Vdy≤Vb2+V2 than the range Vb1−V1≤Vdy≤Vb1+V1 of the drive voltage Vdy of the waveform Wyn illustrated in FIG. 5. The waveform Wyr fluctuates based on the bias voltage Vb=Vb2=0. The fluctuation of the waveform Wyr is smaller than the fluctuation of the waveform Wyn illustrated in FIG. 5. That is, the absolute value of the drive voltage Vd applied to each of the piezoelectric elements 150 in the relaxation operation state is smaller than that in the normal operation state.

FIG. 7 is a flowchart illustrating an example of a method for switching the bias voltage and the drive voltage to be applied to each of the piezoelectric elements 150 of the microactuator 16M according to the present embodiment.

The MPU 60 executes the access process in response to a command from the host 100 or the like (B701), and determines whether the operation state is the relaxation operation state or not (B702). In other words, the MPU 60 determines whether the operation state is the relaxation operation state or the normal operation state.

Upon determining that the operation state is not the relaxation operation state, that is, the operation state is the normal operation state (NO in B702), the MPU 60 applies the bias voltage Vb=Vb1 to the piezoelectric element 150 (B703). The MPU 60 switches from the range Vb2−V2≤Vd≤Vb2+V2 of the drive voltage Vd to be applied to the piezoelectric element 150 to the range Vb1−V1≤Vd≤Vb1+V1 of the drive voltage Vd (B704), and ends the process.

Upon determining that the operation state is the relaxation operation state (YES in B702), the MPU 60 applies, to the piezoelectric element 150, the bias voltage Vb=Vb2, which is smaller than the bias voltage Vb=Vb1 that is to be applied when the MPU 60 determines that the operation state is the normal operation state (B705). Upon determining that the operation state is the relaxation operation state, the MPU 60 switches from the range Vb1−V1≤Vd≤Vb1+V1 of the drive voltage Vd to be applied to the piezoelectric element 150 to the range Vb2−V2 Vd Vb2+V2 of the drive voltage Vd to be applied to the piezoelectric element 150 that is narrower than (or less than or equal to) the range Vb1−V1≤Vd≤Vb1+V1 of the drive voltage Vd (B706), and ends the process.

According to the present embodiment, upon determining that the magnetic disk device 1 is in the normal operation state, the MPU 60 applies the bias voltage Vb=Vb1 to the piezoelectric element 150, and switches from the range Vb2−V2≤Vd≤Vb2+V2 of the drive voltage Vd to be applied to the piezoelectric element 150 to the range Vb1−V1≤Vd≤Vb1+V1 of the drive voltage Vd. Upon determining that the operation state is the relaxation operation state, the magnetic disk device 1 applies, to the piezoelectric element 150, the bias voltage Vb=Vb2, which is smaller than the bias voltage Vb=Vb1 that is to be applied when it is determined that the operation state is the normal operation state, and switches from the range Vb1−V1≤Vd≤Vb1+V1 of the drive voltage Vd to be applied to the piezoelectric element 150 when it is determined that the operation state is the normal operation state to the range Vb2−V2≤Vd≤Vb2+V2 of the drive voltage Vd to be applied to the piezoelectric element 150 that is narrower than (or equal to or less than) the range Vb1−V1≤Vd≤Vb1+V1 of the drive voltage Vd. The magnetic disk device 1 can reduce the bias voltage applied to the piezoelectric element 150 in the relaxation operation state as compared with the normal operation state. In addition, the magnetic disk device 1 can reduce the range of the drive voltage Vd in the relaxation operation state as compared with the normal operation state. Therefore, the magnetic disk device 1 can suppress the migration of the conductive adhesive Ad that bonds the piezoelectric elements 150 to the first connection pad 170a and the second connection pad 170b, and the amplitude limit to (the waveform of) the drive voltage is set to reduce the possibility that the polarized piezoelectric elements 150 is depolarized due to the application of the reverse voltage. Therefore, the magnetic disk device 1 can improve reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a disk;
a head that writes data to the disk and reads data from the disk;
an actuator that is rotationally driven and controls movement of the head mounted above the disk;
a microactuator that is mounted on the actuator and finely swings the head in a radial direction of the disk by a two piezoelectric elements that extend and contract when a drive voltage inverted with respect to a bias voltage is applied to the two piezoelectric elements to drive the two piezoelectric elements;
a bias voltage control circuit that controls the bias voltage; and a controller that switches the bias voltage from a first bias voltage to a second bias voltage according to an operation state during an access process.

2. The magnetic disk device according to claim 1, wherein the controller switches a range of the drive voltage according to the operation state.

3. The magnetic disk device according to claim 1, wherein the controller switches the bias voltage from a first bias voltage to a second bias voltage lower than the first bias voltage.

4. The magnetic disk device according to claim 3, wherein the controller switches a range of the drive voltage from a first drive voltage range to a second drive voltage range equal to or less than the first drive voltage range.

5. The magnetic disk device according to claim 4, wherein the controller switches the bias voltage from the first bias voltage to the second bias voltage and switches the range of the drive voltage from the first drive voltage range to the second drive voltage range equal to or less than the first drive voltage range during a background operation.

6. The magnetic disk device according to claim 4, wherein the controller switches the bias voltage from the first bias voltage to the second bias voltage and switches the range of the drive voltage from the first drive voltage range to the second drive voltage range equal to or less than the first drive voltage range when external vibration is small.

7. The magnetic disk device according to claim 6, wherein the controller switches the bias voltage from the first bias voltage to the second bias voltage and switches the range of the drive voltage from the first drive voltage range to the second drive voltage range equal to or less than the first drive voltage range when positioning error is smaller than a threshold indicating that the external vibration is larger than allowable magnitude.

8. The magnetic disk device according to claim 6, further comprising
a sensor that detects a detection value of rotation and vibration, wherein
when the detection value is smaller than a threshold indicating that the external vibration is larger than allowable magnitude, the controller switches the bias voltage from the first bias voltage to the second bias voltage and switches the range of the drive voltage from the first drive voltage range to the second drive voltage range equal to or less than the first drive voltage range.

9. The magnetic disk device according to claim 4, wherein the controller sets a lower limit value of the first drive voltage range to a value equal to or higher than a lower limit of a reverse bias voltage.

10. The magnetic disk device according to claim 9, wherein an absolute value of the second drive voltage range is equal to or less than an absolute value of the first drive voltage range.

11. A method for switching a bias voltage and a drive voltage of a microactuator applied to a magnetic disk device including a disk, a head that writes data to the disk and reads data from the disk, an actuator that is rotationally driven and controls movement of the head mounted above the disk, a microactuator that is mounted on the actuator and finely swings the head in a radial direction of the disk by two piezoelectric elements that extend and contract when a drive voltage inverted with respect to a bias voltage is applied to the two piezoelectric elements to drive the two piezoelectric elements, and a bias voltage control circuit that controls the bias voltage, the method comprising switching the bias voltage from a first bias voltage to a second bias voltage according to an operation state during an access process.

12. The method for switching the bias voltage and the drive voltage of the microactuator according to claim 11, further comprising;
switching a range of the drive voltage according to the operation state.

13. The method for switching the bias voltage and the drive voltage of the microactuator according to claim 11, further comprising;
switching the bias voltage from a first bias voltage to a second bias voltage lower than the first bias voltage.

14. The method for switching the bias voltage and the drive voltage of the microactuator according to claim 13, further comprising;
switching a range of the drive voltage from a first drive voltage range to a second drive voltage range equal to or less than the first drive voltage range.

15. The method for switching the bias voltage and the drive voltage of the microactuator according to claim 14, further comprising:
during a background operation,
switching the bias voltage from the first bias voltage to the second bias voltage; and
switching the range of the drive voltage from the first drive voltage range to the second drive voltage range equal to or less than the first drive voltage range.

16. The method for switching the bias voltage and the drive voltage of the microactuator according to claim 14, further comprising:
when external vibration is small,
switching the bias voltage from the first bias voltage to the second bias voltage; and
switching the range of the drive voltage from the first drive voltage range to the second drive voltage range equal to or less than the first drive voltage range.

17. The method for switching the bias voltage and the drive voltage of the microactuator according to claim 16, further comprising:
when positioning error is smaller than a threshold indicating that the external vibration is larger than allowable magnitude,
switching the bias voltage from the first bias voltage to the second bias voltage; and
switching the range of the drive voltage from the first drive voltage range to the second drive voltage range equal to or less than the first drive voltage range.

18. The method for switching the bias voltage and the drive voltage of the microactuator according to claim 16, the magnetic disk device further including a sensor that detects a detection value of rotation and vibration, further comprising:
when the detection value is smaller than a threshold indicating that the external vibration is larger than allowable magnitude,
switching the bias voltage from the first bias voltage to the second bias voltage; and
switching the range of the drive voltage from the first drive voltage range to the second drive voltage range equal to or less than the first drive voltage range.

19. The method for switching the bias voltage and the drive voltage of the microactuator according to claim 14, further comprising;
setting a lower limit value of the first drive voltage range to a value equal to or higher than a lower limit of a reverse bias voltage.

20. The method for switching the bias voltage and the drive voltage of the microactuator according to claim 19, wherein an absolute value of the second drive voltage range is less than or equal to an absolute value of the first drive voltage range.

* * * * *